United States Patent [19]
Takano et al.

[11] Patent Number: 6,074,511
[45] Date of Patent: Jun. 13, 2000

[54] METHOD OF JOINING PLASTIC OPTICAL FIBERS TO EACH OTHER

[75] Inventors: Yoshinobu Takano; Norihide Sugiyama, both of Yokohama, Japan

[73] Assignee: Asahi Glass Company Ltd., Tokyo, Japan

[21] Appl. No.: 09/147,500

[22] PCT Filed: May 11, 1998

[86] PCT No.: PCT/JP98/02064

§ 371 Date: Jan. 11, 1999

§ 102(e) Date: Jan. 11, 1999

[87] PCT Pub. No.: WO98/52079

PCT Pub. Date: Nov. 19, 1998

[30] Foreign Application Priority Data

May 12, 1997 [JP] Japan .................................. 9-121230

[51] Int. Cl.[7] ............................ B65H 69/00; B29C 65/00; B29D 11/00
[52] U.S. Cl. ........................ 156/304.2; 156/158; 156/305; 156/308.6; 264/1.25
[58] Field of Search ........................... 156/304.2, 305, 156/308.6; 264/1.25; 156/157, 158

[56] References Cited

U.S. PATENT DOCUMENTS

| | | | |
|---|---|---|---|
| 4,675,136 | 6/1987 | Calvet et al. | 264/1.5 |
| 5,013,495 | 5/1991 | Noba et al. | 264/1.5 |
| 5,226,995 | 7/1993 | White | 156/158 |

FOREIGN PATENT DOCUMENTS

| | | |
|---|---|---|
| 57-40215 | 3/1982 | Japan . |
| 1-100504 | 4/1989 | Japan . |
| 8-5848 | 1/1996 | Japan . |

*Primary Examiner*—Richard Crispino
*Assistant Examiner*—Sue A. Purvis
*Attorney, Agent, or Firm*—Oblon, Spivak, McClelland, Maier & Neustadt, P.C.

[57] ABSTRACT

A splicing method for plastic optical fibers, wherein solvent splicing is carried out by means of an organic solvent 4 capable of dissolving or swelling the plastic material of plastic optical fibers 1 and 2.

9 Claims, 1 Drawing Sheet

(a)  (b)

METHOD OF JOINING PLASTIC OPTICAL FIBERS TO EACH OTHER

TECHNICAL FIELD

The present invention relates to a splicing method for plastic optical fibers themselves.

BACKGROUND ART

Heretofore, as a splicing method for optical fibers, with respect to optical fibers employing silica as a material having a high melting point, a method has been known in which a very high temperature is created by electric arc discharge, and optical fibers thereby melted are spliced to each other. However, to let very small portions like optical fiber tips undergo electric discharge, an extremely high level of technique and precision in control are required, and to let silica be melted, a large electric power was required.

On the other hand, with respect to plastic optical fibers such as acrylic plastic optical fibers or fluorine type plastic optical fibers (see e.g. JP-A-8-5848), no method for efficiently splicing optical fibers themselves, has been known.

The present invention is intended to provide a method for readily splicing plastic optical fibers themselves, whereby the splicing efficiency is increased, and an increase in the transmission loss is reduced.

DISCLOSURE OF THE INVENTION

The present invention is a splicing method for plastic optical fibers, which is a method for splicing ends of plastic optical fibers themselves, characterized in that solvent splicing is carried out by means of an organic solvent capable of dissolving or swelling the plastic material of the plastic optical fibers.

In the present invention, a plastic optical fiber is "a general term for an optical fiber cord and an optical fiber string, of which at least a light transmitting portion is made of a plastic material"(hereinafter may sometimes be referred to simply as an optical fiber), and an optical fiber cord is one having an optical fiber string covered with a covering material. Here, the light-transmitting portion is meant for a core portion in the case of a refractive index stepped optical fiber, or a portion where at least 5% of the maximum intensity occupies in the distribution in the fiber radial direction of the intensity of light outgoing from the fiber in the case of a graded-index optical fiber.

In the present invention, solvent splicing means that plastic materials themselves dissolved or swelled by the organic solvent, are contacted or mixed, followed by evaporation of the organic solvent in the plastic materials, whereby the plastic materials themselves are solidified, so that the plastic optical fibers themselves are spliced to each other.

In the present invention, the method for solvent-splicing the ends of plastic optical fibers themselves, may, for example, be (1) a method wherein the ends of optical fibers themselves are solvent-spliced by permitting the solvent to penetrate into a clearance between the ends of optical fibers themselves, which is formed by bringing the ends of optical fibers themselves close to each other, (2) a method wherein the ends of optical fibers themselves are solvent-spliced by contacting the optical fiber ends themselves dissolved or swelled by the organic solvent, or (3) a method wherein the ends of optical fibers themselves are solvent-spliced, while permitting the optical fibers themselves to butt against each other by the bending stress of the optical fibers.

The splicing method of the present invention makes it possible to readily splice plastic optical fibers themselves and to increase the splicing efficiency and reduce an increase of transmission loss. Further, by using a reinforcing member for the joint portion, position setting of the optical fibers can be facilitated, a proper pressure can easily be exerted to the joint surfaces of the optical fibers, and the joint portion of the plastic optical fibers themselves can be reinforced.

BEST MODE FOR CARRYING OUT THE INVENTION

Figure 1:
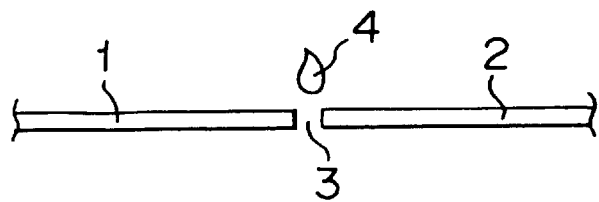
FIG. 1 is a schematic view illustrating optical fibers and a solvent.
Figure 2:
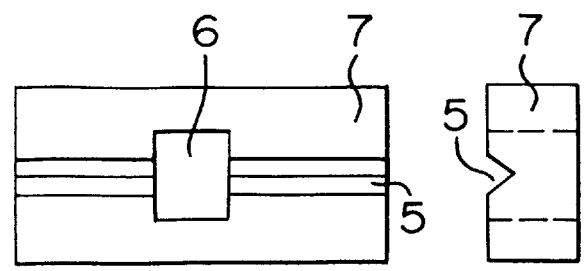
FIG. 2 is a schematic view of a supporting tool for splicing optical fibers, which has a V-groove and a void space.
Figure 3:
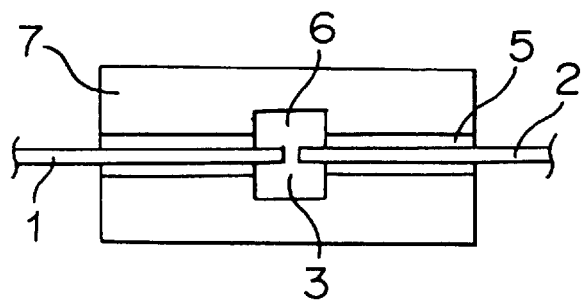
FIG. 3 is a schematic plan view showing the state in which optical fibers are placed on the supporting tool.
Figure 4:
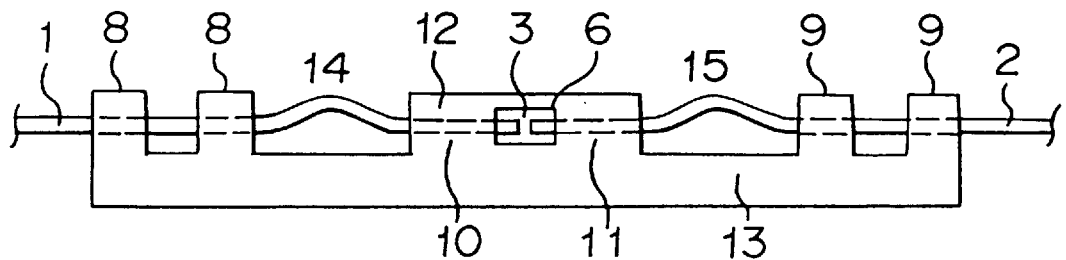
FIG. 4 is a schematic plan view showing the state in which optical fibers are placed on a reinforcing member for the joint portion.

Now, the present invention will be described with reference to FIGS. 1 to 4. FIG. 1 is a schematic view showing optical fibers 1 and 2 to be spliced, and a solvent 4. FIG. 2(a) is a schematic plan view of a supporting tool 7 for splicing optical fibers, which has a V-groove 5 and a void space 6, and FIG. 2(b) is a schematic front view of the supporting tool 7. FIG. 3 is a schematic plan view showing the state in which optical fibers 1 and 2 are placed on the supporting tool 7. FIG. 4 is a schematic plan view showing the state wherein optical fibers are placed on a reinforcing member for the joint portion.

The joint end surfaces of forward ends of the optical fibers 1 and 2 may not necessarily be completely flat surfaces and may be in a rough state as simply cut by e.g. a razor. It is preferred that the optical fibers 1 and 2 are butted against each other by means of a micro positioner apparatus such as a three axes micro positioner apparatus for optical experiments.

When the solvent 4 is applied to the butting portion 3 of the optical fibers 1 and 2, the joint ends surfaces made of a plastic material of the forward ends of the respective optical fibers will be partially melted and mixed. Then, when the melted plastic material dries and solidifies, the optical fibers 1 and 2 will be fixed.

Instead of using the micro positioner apparatus, the optical fibers 1 and 2 may be placed on a supporting tool 7 for splicing optical fibers, which has a V-groove 5 and a void space 6, so that the optical fibers 1 and 2 will be butted and spliced. In this case, there is a merit that an excess solvent at the butting portion 3 can be discharged from the void space 6. The material for the supporting tool 7 is preferably stainless steel, aluminum alloy or brass.

In the method for solvent-splicing the ends of the optical fibers themselves by permitting the optical fibers themselves to butt against each other by the bending stress of the optical fibers, it is preferred to employ a reinforcing member 13 for the joint portion.

The optical fibers 1 and 2 are inserted from both ends of the reinforcing member 13 for the joint portion to butt against each other at the optical fiber-butting portion 3. The reinforcing member 13 for the joint portion has optical fiber securing portions 8 and 9 and an optical fiber guide 12. The reinforcing member 13 for the joint portion may be integrally formed, or the optical fiber securing portions 8 and 9 and the optical fiber guide 12 may preliminarily be formed, and they may be spliced to form the reinforcing member 13 for the joint portion. The material for the reinforcing member 13 for the joint portion is preferably the same as the material for the supporting tool 7 or various synthetic resins.

The optical fiber guide 12 has alignment portions 10 and 11 and a void space 6. The alignment portions 10 and 11 are provided with grooves which are capable of precisely guiding and linearly sliding the optical fibers 1 and 2.

At bending stress portions 14 and 15, spaces are secured so that the optical fibers can be bent. By pushing the optical fibers from both ends with a proper force, the optical fibers will be arched at the bending stress portions 14 and 15. Then, the optical fibers are secured at the optical fiber securing portions 8 and 9, whereby a butting force will continuously be exerted to the optical fiber butting portion 3 by the force of the arched optical fibers which try to regain the initial state.

When a solvent is applied to the butting portion 3 from the void space 6 at the butting portion, the cut surfaces of the respective optical fibers will be partially dissolved and mingled. At that time, the optical fibers will be shortened for a length corresponding to the dissolved amount, but by the stress of the arched optical fibers, a constant butting force can continuously be exerted. Thereafter, when the dissolved resin dries and solidifies, the optical fibers 1 and 2 will be fixed. The void space 6 makes the application of the solvent possible and at the same time serves to promote drying of the solvent.

As the method for securing the optical fibers at the securing portions 8 and 9, a method of employing an adhesive or a method of mechanically securing may, for example, be mentioned. After splicing the optical fibers 1 and 2, the optical fibers may be secured at the alignment portions 10 and 11. As such a securing method, the same method as the method for securing optical fibers at the securing portions 8 and 9 may be employed.

Further, the optical fibers 1 and 2 may be secured at the securing portions 8 and 9 or at the alignment portions 10 and 11, and the optical fibers 1 and 2 may be butted without splicing at the butting portion 3.

The arching of the optical fibers at the bending stress portions 14 and 15, also serves to cancel out the difference in linear expansion by heat between the reinforcing member 13 for the joint portion and the optical fibers 1 and 2.

The optical fiber diameter is preferably from 100 to 1000 $\mu$m, more preferably from 250 to 750 $\mu$m. The length in the optical fiber direction of the optical fiber guide 12 is preferably from 10 to 100 times, more preferably from 20 to 50 times, the optical fiber diameter. The length in the optical fiber direction of the stress portions 14 and 15 is preferably from 10 to 50 times, more preferably from 20 to 40 times, the optical fiber diameter.

When the solvent 4 is applied, if the optical fiber 1 and the optical fiber 2 are too close, the solvent 4 may not well penetrate to the joint surface of the optical fibers 1 and 2. In such a case, the optical fiber 1 and the optical fiber 2 may be separated a little. The distance for such separation is preferably from 1 to 50 $\mu$m, more preferably from 1 to 30 $\mu$m.

Otherwise, after permitting the solvent to penetrate, the optical fibers may be brought to be close to each other. Further, upon drying, the plastic material shrinks a little, and the optical fibers may be brought to be close to each other taking such shrinkage into account.

The viscosity of the solvent is preferably such that it will penetrate into the clearance between the optical fibers 1 and 2 and at the same time will not spread so much. Therefore, the viscosity of the solvent may be adjusted by dissolving the plastic material of the optical fibers in the solvent. The concentration of the plastic material in the solvent solution is preferably from 0.01 to 30 wt %, more preferably from 0.1 to 10 wt %.

Further, as a method for drying the solvent, not only natural drying, but also conduction heat, radiation heat or heat by high frequency induction may, for example, be employed. Further, in the method of butting the optical fibers, micro positioner may be carried out under observation by e.g. a microscope, or micro positioner may be carried out by propagating light and measuring the amount.

The solvent to be used in the present invention, may be suitably selected among those which are capable of dissolving or swelling the plastic material for the joint end surfaces of the forward ends of the optical fibers. In the case of a fluorine type plastic material, a fluorine type organic solvent, particularly a perfluoro organic solvent, is preferred. The perfluoro organic solvent may, for example, be a perfluoroalkane such as perfluorohexane, perfluorooctane or perfluorodecane, a perfluorotrialkylamine such as perfluorotripropylamine or perfluorotributylamine, a perfluoro cyclic ether such as perfluoro(2-butyltetrahydrofuran), or a perfluoro aromatic compound such as perfluorobenzene.

At the time of splicing optical fibers constituted by different types of plastic materials, such as the string and the covering material of an optical fiber cord, or the core and the cladding of an optical fiber string, a solvent capable of commonly dissolving the different types of plastic materials, may be employed, or two or more solvents may be used depending upon the types of the plastic materials.

The optical fibers in the present invention may be step-index optical fibers or graded-index optical fibers. Further, they may be those wherein the light transmitting portion is made of a non-fluorine type plastic material, or a fluorine type plastic material, or they may be a combination of a non-fluorine type plastic material and a fluorine type plastic material, such as a combination of a core made of a non-fluorine type plastic material and a cladding made of a fluorine type plastic material.

As the fluorine type plastic material, a noncrystalline fluorine-containing polymer having substantially no C—H bond is preferred. More preferred is a fluorine-containing polymer which is non-crystalline with substantially no C—H bond and which has a ring structure in its main chain.

As the above fluorine-containing polymer having a cyclic structure in its main chain, a fluorine polymer having a fluorine-containing alicyclic structure, a fluorine-containing imide ring structure, a fluorine-containing triazine ring structure or a fluorine-containing aromatic ring structure, is preferred. As the fluorine-containing polymer having a fluorine-containing alicyclic structure, one having a fluorine-containing aliphatic ether ring is more preferred.

The fluorine-containing polymer having a cyclic structure in its main chain preferably has at least 20 mol %, more preferably at least 40 mol %, of polymer units having a ring structure, from the viewpoint of transparency, mechanical properties, etc.

The fluorine-containing polymer having a fluorine-containing aliphatic ring structure is a preferred polymer for such a reason that as compared with a fluorine-containing polymer having a fluorine-containing imide ring structure, a fluorine-containing triazine ring structure or a fluorine-containing aromatic ring structure, the polymer molecules are less likely to be aligned even at the time of hot stretching or forming into optical fibers by melt spinning, and consequently, it is free from scattering of light.

Preferred as the polymer having a fluorine-containing aliphatic ring structure is one obtainable by polymerizing a monomer having a fluorine-containing cyclic structure, or a polymer having a fluorine-containing alicyclic structure in its main chain obtainable by cyclic polymerization of a fluorine-containing monomer having at least two polymerizable double bonds.

The polymer having a fluorine-containing alicyclic ring structure in its main chain, obtainable by polymerizing a monomer having a fluorine-containing alicyclic ring structure, is known, for example, by JP-B-63-18964. Namely, a polymer having a fluorine-containing alicyclic ring structure in its main chain, can be obtained by homopolymerization of a monomer having a fluorine-containing alicyclic ring structure, such as perfluoro(2,2-dimethyl-1,3-dioxole), or by copolymerizing this monomer with a radical polymerizable monomer such as tetrafluoroethylene, chlorotrifluoroethylene or perfluoro(methyl vinyl ether).

Further, the polymer having a fluorine-containing aliphatic ring structure in its main chain, obtainable by cyclic polymerization of a fluorine-containing monomer having at least two polymerizable double bonds, is known, for example, by JP-A-63-238111 or JP-A-63-238115. Namely, a polymer having a fluorine-containing aliphatic ring structure in its main chain, can be obtained by cyclic polymerization of a monomer such as perfluoro(allyl vinyl ether) or perfluoro(butenyl vinyl ether), or by copolymerizing such a monomer with a radical polymerizable monomer such as tetrafluoroethylene, chlorotrifluoroethylene, or perfluoro (methyl vinyl ether).

Further, a polymer having a fluorine-containing aliphatic cyclic structure in its main chain may also be obtained by copolymerizing a monomer having a fluorine-containing aliphatic ring structure such as perfluoro(2,2-dimethyl-1,3-dioxole) with a fluorine-containing monomer having at least two polymerizable double bonds such as perfluoro(allyl vinyl ether) or perfluoro(butenyl vinyl ether).

As a step-index optical fiber having a fluorine type plastic material as the core material, one known, for example, by JP-A-4-189862, may be mentioned.

As the above-described graded-index optical fiber, one made of a matrix resin having a refractive index difference and a diffusate, wherein the diffusate is distributed in the matrix resin with a concentration gradient along a certain specific direction. Particularly preferred is a graded-index fluorine type plastic optical fiber comprising a fluorine-containing polymer as a matrix resin and a low molecular weight fluorine type compound as a diffusate, since it has a low transmission loss and a high transmission zone within a wide range of transmission zone (see JP-A-8-5848).

In such a case, the number average molecular weight of the fluorine-containing polymer is preferably from 10,000 to 5,000,000, more preferably from 50,000 to 1,000,000. The number average molecular weight of the low molecular weight fluorine type compound is preferably from 300 to 10,000, more preferably from 300 to 5,000.

Now, the present invention will be described in further detail with reference to Examples. However, it should be understood that the present invention is by no means restricted by such specific Examples.

EXAMPLE 1
(Preparation Example)

35 g of perfluoro(butenyl vinyl ether) (PBVE), 150 g of deionized water and 90 mg of $((CH_3)_2CHOCOO)_2$ as a polymerization initiator, were put into an autoclave made of pressure resistant glass having an internal capacity of 200 ml. The interior of the system was replaced three times with nitrogen, and then suspension polymerization was carried out at 40° C. for 22 hours. As a result, a polymer having a number average molecular weight of about $1.5 \times 10^5$ (hereinafter referred to as polymer A) was obtained in an amount of 28 g.

The specific viscosity [η] of polymer A was 0.50 dl/g at 30° C. in perfluoro(2-butyltetrahydrofuran) (PBTHF) Polymer A had a glass transition point of 108° C. and was a tough transparent glassy polymer at room temperature. Further, its 10% thermal decomposition temperature was 465° C., and the solubility parameter was 5.3 $(cal/cm^3)^{1/2}$, and the refractive index was 1.34.

EXAMPLE 2
(Working Example)

Polymer A obtained in Example 1 was dissolved in a PBTHF solvent, and 1,3-dibromotetrafluorobenzene (DBTFB) having a refractive index of 1.52 and a difference in the solubility parameter from polymer A of 3.2 $(cal/cm^3)^{1/2}$, was added thereto in an amount of 12 wt % to obtain a mixed solution. This solution was subjected to solvent removal to obtain a transparent mixed polymer (hereinafter referred to as polymer B).

Polymer A was melted, and while injecting a molten liquid of polymer B at the center, melt spinning was carried out at 300° C. to obtain a graded-index optical fiber (fiber diameter: 350 μm) wherein the refractive index gradually lowered from the center towards the periphery.

This graded-index optical fiber was cut by a razor, then placed on the V-groove having a three axes micro positioner apparatus for optical experiments, and a weight was placed thereon to secure it. Then, while observing the joint portion by a magnifier, position setting was carried out by the micro positioner apparatus so that the cut surfaces came close to each other with a distance of 10 μm.

Then, at the joint portion, PBTHF was dropped by a syringe, whereupon PBTHF penetrated between the two optical fibers. They were left to stand about 30 minutes, and then removed from the V-groove, whereby the optical fibers were found to be spliced. The coupling loss was measured by injected light into the optical fibers and was found to be 0.26 dB.

EXAMPLE 3
(Working Example)

The optical fibers 1 and 2 of Example 2 cut by a razor were inserted from both ends of the reinforcing member 13 for the joint portion in FIG. 4 to butt against each other at the optical fiber butting portion 3. Further, by pushing the optical fibers with a proper force from both ends, the optical fibers were slightly arched at the bending stress portions 14 and 15. In that state, an adhesive was injected to the optical fiber securing portions 8 and 9, and the optical fibers 1 and 2 and the reinforcing member 13 for the joint portion were held until they were fixed.

Then, from the void space 6 of the butting portion, a PBTHF solution of PBVE (concentration: 2 wt %) was applied to the butting portion 3, the respective optical fiber cutting surfaces were partially dissolved and mingled, and then, when the dissolved resin dried and solidified, the optical fibers 1 and 2 were fixed. The coupling loss was measured by injected light into the optical fibers and was found to be 0.5 dB.

What is claimed is:

1. A splicing method for plastic optical fibers, which is a method for splicing ends of plastic optical fibers themselves, characterized in that solvent splicing is carried out by means of an organic solvent capable of dissolving or swelling the plastic material of the plastic optical fibers.

2. The splicing method according to claim 1, wherein the plastic optical fibers are fluorine type plastic optical fibers, and the organic solvent is a fluorine type organic solvent.

3. The splicing method according to claim 1, wherein the plastic material is a non-crystalline fluorine-containing polymer having substantially no C—H bond.

4. The splicing method according to claim 1, wherein the fluorine type organic solvent is a perfluoro organic solvent.

5. The splicing method according to claim 1, wherein the plastic optical fibers are graded-index optical fibers.

6. The splicing method according to claim 1, wherein the solvent splicing is one wherein the ends of optical fibers themselves are solvent-spliced by permitting the solvent to penetrate into a clearance between the ends of optical fibers themselves, which is formed by bringing the ends of optical fibers themselves close to each other.

7. The splicing method according to claim 1, wherein the solvent splicing is one wherein the ends of optical fibers themselves are solvent-spliced by contacting the ends of optical fibers themselves dissolved or swelled by the organic solvent.

8. The splicing method according to claim 1, wherein the solvent splicing is one wherein the ends of optical fibers themselves are solvent-spliced while permitting the optical fibers themselves to butt against each other by the bending stress of the optical fibers.

9. The splicing method according to claim 1, wherein the organic solvent contains a plastic material.

* * * * *